Sept. 17, 1940.  P. M. ANGELL  2,214,917
METHOD OF MANUFACTURE OF COMPOSITE ICE CREAM CAKE
Filed July 21, 1938
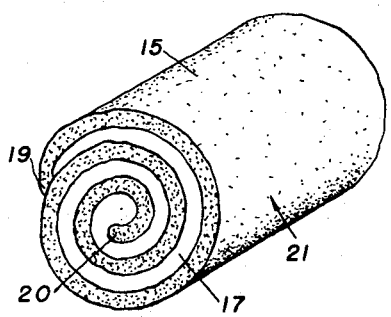
FIG. 1.
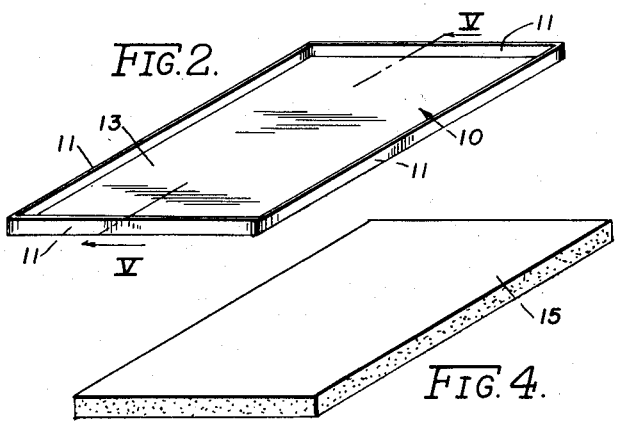
FIG. 2.
FIG. 4.
FIG. 3.
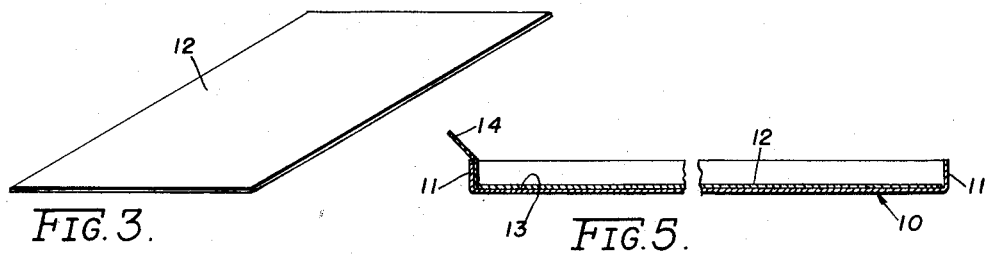
FIG. 5.
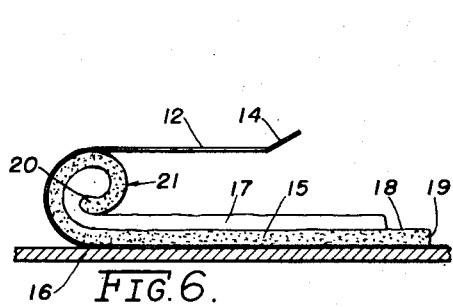
FIG. 6.
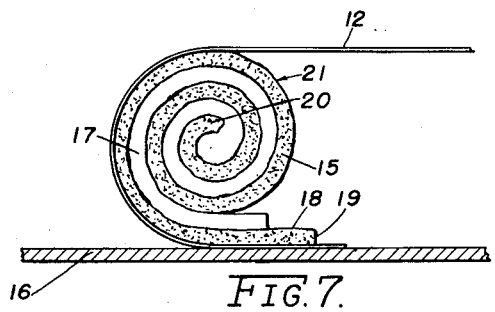
FIG. 7.
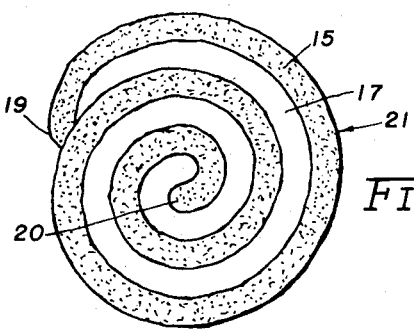
FIG. 8.
INVENTOR.
PAUL M. ANGELL.
BY *Harry C. [signature]*
ATTORNEY.

Patented Sept. 17, 1940

2,214,917

UNITED STATES PATENT OFFICE 2,214,917

METHOD OF MANUFACTURE OF COMPOSITE ICE CREAM CAKE

Paul M. Angell, Chicago, Ill., assignor to Newly Weds Baking Company, Chicago, Ill., a corporation of Illinois Application July 21, 1938, Serial No. 220,425

9 Claims. (Cl. 99—137)

This invention relates to composite ice cream cakes and their method of manufacture, and more particularly to composite ice cream cakes of the spiral roll type although certain features thereof may be employed with equal advantage for other purposes.

It contemplates more especially the provision of improved pre-baked dough products that are substantially non-porous and have greater moisture keeping with more flexible lasting qualities than similar products heretofore proposed for the same or similar purpose.

Composite ice cream cakes of numerous types have heretofore been proposed, but these are either of the pre-molded, stacked or roll type which primarily serve their purpose as a caterer's or home produced product. Because of their porous texture, dryness, and inflexible character after being cooled from oven temperature, these products do not lend themselves to production operations for sale over the counter where there is appreciable demand for composite edible commodities of this character. In order to render such commodities available for the market on a production basis, it is necessary that the pre-baked dough products constituting a part thereof should be substantially non-porous and possessed of appreciable moisture keeping qualities and flexible lasting qualities that permit their use for extended periods of storage or shipment to even remote points of assimilation with ice cream.

It is impractical to attempt the provision of composite edible products of their character at a central plant for shipment over great distances owing to the cost of refrigeration in transit required by normally liquid materials frozen to a substantially solid state such as ice cream. Then, too, ice cream is essentially produced for local markets, and the layer cakes must be made available from a central plant of production for economic purposes, since such is essentially a special purpose layer cake and volume production is only possible from a central baking plant.

It is important, therefore, that the pre-baked dough product be possessed of substantially non-porous texture and moisture keeping together with flexible lasting qualities over extended periods of time to enable shipment thereof to distant markets and storage preparatory for production into a composite edible product including ice cream of local manufacture.

Pre-baked dough products of known composition and methods of production have not proven entirely satisfactory for this purpose since a substantially non-porous texture coupled with flexibility over extended period and a high moisture content retained against evaporation, serve to resist further moisture absorption from the ice cream that contacts therewith in the production of the composite ice cream cake product. These characteristics are procured with an improved compounding of ingredients and method of production that renders possible a highly satisfactory composite edible ice cream cake roll prepared on a production basis with uniformity in keeping characteristics and eating qualities that are highly necessary or at least desirable from a commercial as well as consumer standpoint.

One object of the present invention is to provide a pre-baked dough having a substantially non-porous texture with appreciable moisture keeping and flexible lasting qualities.

Another object is to provide an improved pre-baked dough product possessing a high moisture content maintained over an extended period of time to enable conversion into a composite ice cream cake roll.

Still another object is to provide an improved pre-baked dough layer cake that retains its initially high moisture and flexible keeping qualities over extended periods of time for commercial conversion into a composite ice cream cake roll.

A further object is to provide an improved composition for preparing a pre-baked dough product possessing a substantially non-porous texture, a high moisture content and flexible lasting qualities that render such capable of use in connection with ice cream in the formation of a composite cake roll.

A still further object is to provide an improved pre-baked layer cake that is substantially non-porous, possessed of a high moisture content, and retains the flexible rolling qualities over extended period of time for processing with ice cream in the production of composite ice cream cake rolls.

Still a further object is to provide an improved method of preparing a pre-baked dough product to impart thereto a high moisture content and flexible lasting qualities over an extended period of time that renders such highly resistant to further external moisture absorption from the ice cream and similar edibles processed therewith into a composite product.

Other objects and advantages will appear from the following description of an illustrative embodiment of the present invention.

In the drawing:

Figure 1 is a perspective view of an edible composite cake roll comprising a product resulting from practicing the teachings of the present invention.

Figure 2 is a perspective view of a shallow baking pan utilized in connection with the method of producing a pre-baked dough product comprising an element of the product shown in Figure 1.

Figure 3 is a perspective view of a greasetight sheet serving as a liner for the baking pan shown in Figure 2.

Figure 4 is a perspective view of a substantially non-porous pre-baked layer cake constituting a component element of the resulting product shown in Figure 1.

Figure 5 is a sectional view in elevation taken substantially along line V—V of Figure 2, it constituting a section of both the baking pan and its liner shown separately in Figures 2 and 3.

Figure 6 is an end view in elevation showing an initial step of rolling the cake layer and ice cream, the flat table surface being shown in section to clarify the showing.

Figure 7 is a view similar to Figure 5 with the composite ice cream and cake layer shown in advanced stage of rolling nearing completion.

Figure 8 is an end view in elevation of the converted composite ice cream cake roll shown in Figure 1.

The structure selected for illustration exemplifies a method of preparing a composite ice cream cake roll embodying features of the present invention. To this end, a specially prepared dough is compounded so that the resulting layer cake will be possessed of a substantially non-porous texture, a high moisture content, and flexible lasting qualities that enable the use thereof for extended periods of storage and shipment in commerce to any distant market. The non-porous, high moisture retaining and lasting flexible qualities can be procured by assimilating a mixture of the following constituents or their equivalents generally known in the baking art, these being as follows:

| | |
|---|---|
| Granulated sugar | 120 lbs. |
| Vegetable shortening | 30 lbs. |
| Soya bean flour | 12 lbs. |
| Baking soda | 2 lbs. 5 oz. |
| Table salt | 2 lbs. 5 oz. |
| Whole eggs | 45 lbs. |
| Dutch process cocoa | 20 lbs. |
| Sweetened skimmed condensed milk | 15 lbs. |
| Soft winter wheat cake flour | 132 lbs. |
| Water | 280 lbs. |
| Baking powder | 5 lbs. |

The foregoing specific ingredients and their respective proportions are merely illustrative and should not be construed as essential or a limitation of the teachings of the present invention. In fact, the proportions and certain of the specific ingredients can be varied and still produce substantially non-porous high moisture keeping and long lasting flexible qualities that renders such resistant to external moisture absorption from the ice cream and capable of being rolled even after extended periods of storage and shipment ranging from three to six weeks.

One illustrative procedure may consist in creaming the granulated sugar and vegetable shortening together for approximately ten minutes by thorough beating and stirring in any suitable power operated mixer. After the sugar and shortening has been thoroughly creamed, the soya bean flour is added thereto for further mixing and stirring in combination with the salt and baking soda until a homogeneous mass is produced. Then, the whole eggs are slowly added and all the cocoa until uniformly mixed therewith. The soya bean flour serves as a high moisture content carrier and retainer.

The condensed milk and fifty (50) pounds of cake flour are then thoroughly beat into the mixture to provide a uniform and completely mixed composition. The remaining cake flour is gradually added with two hundred and eighty pounds (280 lbs.) of water by alternately mixing increments of cake flour and water for gradual assimilation in a mixture that is being constantly stirred in the power operated mixer that still has the prior mixed batch or batches therein. After this has been accomplished and a homogeneous mixture of all the ingredients has been produced, the very last step involves the beating in of the baking powder preparatory to placement in a shallow pan and subjecting the dough to elevated temperatures to accomplish the baking thereof.

The above procedure and proportions produce substantially six hundred (600) pounds of moist dough that is plastic and capable of being spread into a number of substantially rectangular shallow pans 10 having parallel upstanding peripheral wall flanges 11. A substantially rectangular grease tight paper sheet 12 conforming substantially in size with the interior of the pan 10, serves as a liner for the pan bottom 13. The liner 12 is preferably though not essentially somewhat longer than the pan 10 to provide an extending flap 14 to enable the finger grasp thereof to readily effect the removal of a baked layer cake 15 therefrom. The dough is first spread to provide a uniform layer in the pans 10 that are placed in ovens and baked for three minutes between 600° and 650° F.

It is highly important that steam be generated during the baking of the moist dough so as to retain its high moisture content and produce a flexible baked sheet devoid of hard surface crusts that would preclude the rolling thereof after the cake has cooled. To this end, the oven damper should be closed during the baking operation unless the oven operating characteristics are such as to render baking possible without drying out any appreciable moisture from the dough or resulting cake. After the baking takes place for three minutes between 600° and 650°, the pans 10 with their contents are removed from the ovens and allowed to cool to room temperature. The layer of pre-baked dough is then removed from the pan 10 with the aid of the liner flap 14 or the pans 10 may be turned over for depositing of the layer cake 15 on another liner 12 supported by a table or other flat top surface 16. The resulting layer cake 15 has a substantially non-porous texture, possesses a high moisture content and has flexible lasting qualities.

This procedure presents the cake 15 on a liner 12 that was formerly in contact with a similar liner 12 while being baked in the pan 10, the glazed surface resulting from contact during the baking operation with the grease tight liner 12. The glazed cake surface is even more moisture resistant than the other substantially non-porous cake surface, and for that reason the ice cream is spread thereover. However, the layer cakes 15 are usually packed in corrugated boxes with the liners 12 interposed therebetween. An extra liner 12 covers the top of the carton stacked layer cakes 15, and these are then sealed for shipment to local or distant markets where they are cut into the desired size such as four to the sheet 15 and rolled in conjunction with ice cream. The layer cakes 15 will remain moist and flexible for upwards of three weeks and at any time during this interim, a layer of ice cream 17 of substantially the same thickness as the cake 15, is spread thereover or coated therewith while disposed on the liner 12 supported by a flat surface 16 such as a table top. It is to be noted that the ice cream 17 is spread over the entire flat layer cake 15 that is thickly coated therewith except for a portion 18 proximate to the remote end 19 thereof which remains uncoated to serve as an end closure for and terminate the spirally wound composite cake 15 and ice cream 17 as will appear more fully hereinafter.

Next, the flap 14 of the liner 12 is grasped by the attendant and pulled toward the remote end 19 of the layer cake 15 so that the cake 15 and ice cream 16 will roll upwardly at the rear end 20 to serve as a core for the spiral roll 21 resulting from continued pulling on the liner 12 and progressive rolling of the edible composite layer cake 15 and ice cream 16 until such assumes a complete spiral roll 21. Thereupon, the uncoated portion 18 near the extremity 19 of the cake 15 is depressed against the adjacent convolute cake surface for self-adherence to terminate the convolute formation and encloses the ice cream 17 therein. The spiral composite roll 21 is then subjected to refrigeration to render such self-sustaining and form-retaining and ready for vending over the counter. The vendor or consumer can then transversely segregate the composite roll 21 into a plurality of uniform slices that are sufficiently cold to be self-sustaining and form-retaining during the consumption thereof with a spoon or fork.

It should be observed that the terms "substantially non-porous texture, high moisture content, and flexible lasting qualities" are only relative in that they attempt to distinguish from normal cakes or prebaked dough products that are usually of marked porosity, low moisture content or moisture retaining ability, and are normally hard crusted and possess little flexibility after being cooled. Minute pores in cakes are regarded as substantially non-porous.

Various changes may be made in the embodiment of the invention herein specifically described without departing from or sacrificing any advantages of the invention or any features thereof, and nothing herein shall be construed as a limitation of this invention, its structural concept, or structural embodiment as to the whole or any part thereof, except as defined in the appended claims.

I claim:

1. The method of preparing an ice cream cake roll which consists in forming a layer of cake dough containing a high shortening and soya bean flour content to impart thereto moisture keeping and flexible lasting qualities; baking said dough at a comparatively high temperature without extracting therefrom any appreciable moisture and prevent forming a crust thereon; placing the cake layer on a paper sheet liner, cooling the cake layer preparatory to use, applying thereto a layer of ice cream of substantially the same thickness as the layer of cake, then pulling the projecting end of the paper sheet liner toward the opposed end for convolutely rolling the cake layer and the ice cream layer into a self-contained composite spiral roll, and then freezing the resutant product to render such self-sustaining and form-retaining.

2. The method of producing an ice cream cake roll which consists in forming a relatively thin layer of cake dough containing a relatively large amount of shortening and soya bean flour to provide a flexible layer of baked cake with a high moisture content so as to be substantially resistant to external moisture, baking said moist dough so as to generate steam to prevent forming a crust and any appreciable moisture extraction therefrom, allowing the cake to cool preparatory to use, applying a layer of ice cream of substantially the same thickness as the layer of cake, then convolutely rolling the cake and ice cream layer with the aid of a thin flexible sheet into the form of a spiral roll wherein the ice cream and cake layers are clearly defined without appreciable absorption therebetween, and then hardening the composite spiral roll to render such self-sustaining and form-retaining.

3. The method of preparing an ice cream cake roll which consists in lining a shallow rectangular pan with a grease tight paper sheet, then forming in said lined pan a layer of cake dough containing a high shortening and soya bean fluor content to impart thereto moisture keeping and flexible lasting qualities, baking said dough at a comparatively high temperature without extracting therefrom any appreciable moisture and prevent forming a crust thereon, cooling the cake layer preparatory to use, removing the prebaked cake from said pan so that the surface adjacent the pan liner is upturned, applying thereto a layer of ice cream of substantially the same thickness as the layer of cake, convolutely rolling the cake layer and the ice cream layer with the aid of the pan liner into a self-contained composite spiral roll, and then freezing the resultant product to render such self-sustaining and form-retaining.

4. The method of producing an ice cream cake roll which consists in lining a shallow rectangular pan with a grease tight paper sheet, then forming a relatively thin layer of cake dough in said lined pan containing a large amount of shortening and soya bean flour to provide a flexible layer of baked cake with a high moisture content so as to be substantially resistant to external moisture, baking said moist dough so as to generate steam to prevent forming a crust and any appreciable moisture extraction therefrom, allowing the cake to cool preparatory to use, applying a layer of ice cream of substantially the same thickness as the layer of cake, then pulling the projecting end of a pan liner sheet toward the opposed end for convolutely rolling the ice cream and cake into the form of a spiral roll wherein the ice cream and cake layers are clearly defined without appreciable absorption therebetween, and then hardening the composite spiral roll to render such self-sustaining and form-retaining.

5. A method of preparing an ice cream cake roll which consists in forming a moist dough from granulated sugar, vegetable shortening, soya bean flour, baking soda, table salt, whole eggs, Dutch process cocoa, sweetened skimmed condensed milk, soft winter wheat cake flour, water, and baking powder; spreading the dough in a uniform layer over a shallow pan lined with a grease tight sheet; baking the dough in a closed oven in the presence of steam generated therefrom to provide a flexible and moist prebaked dough product; allowing the prebaked dough product to cool preparatory to use; applying a layer of ice cream of substantially the same thickness as the layer of cake; then convolutely rolling the layer of cake and ice cream layer into a spiral roll, wherein the ice cream and cake are distinct layers; and then hardening the composite spiral roll to render such self-sustaining and form-retaining.

6. A method of preparing an ice cream cake roll which consists in forming a moist dough from 120 lbs. granulated sugar, 30 lbs. vegetable shortening, 12 lbs. soya bean flour, 2 lbs. 5 oz. baking soda, 2 lbs. 5 oz. table salt, 45 lbs. whole eggs, 20 lbs. Dutch process cocoa, 15 lbs. sweetened skimmed condensed milk, 132 lbs. soft winter wheat cake flour, 280 lbs. water, 5 lbs. baking powder; spreading the dough in a uniform layer over a shallow pan lined with a grease tight sheet; baking the dough in a closed oven in the presence of steam generated therefrom to provide a flexible and moist prebaked dough product; allowing the prebaked dough product to cool preparatory to use; applying a layer of ice cream of substantially the same thickness as the layer of cake; then convolutely rolling the layer of cake and ice cream layer into a spiral roll, wherein the ice cream and cake are distinct layers; and then hardening the composite spiral roll to render such self-sustaining and form-retaining.

7. A method of preparing an ice cream cake roll which consists in lining a shallow rectangular pan with a grease tight paper sheet, then forming in said lined pan a moist dough from granulated sugar, vegetable shortening, soya bean flour, baking soda, table salt, whole eggs, Dutch process cocoa, sweetened skimmed condensed milk, soft winter wheat cake flour, water, and baking powder; spreading the dough in a uniform layer over the shallow pan lined with a grease tight sheet; baking the dough in a closed oven in the presence of steam generated therefrom to provide a flexible and moist prebaked dough product; allowing the prebaked dough product to cool preparatory to use; applying a layer of ice cream of substantially the same thickness as the layer of cake; then convolutely rolling the layer of cake and ice cream layer into a spiral roll, wherein the ice cream and cake are distinct layers; and then hardening the composite spiral roll to render such self-sustaining and form-retaining.

8. A method of producing an ice cream layer cake which consists in preparing a high moisture content flexible and substantially non-porous baked layer cake, placing the layer cake on a paper lined supporting surface with a glazed cake face upwardly, then coating the layer of cake by spreading a substantial uniform layer of semi-frozen ice cream over the glazed face of the cake to define flat superposed layers, then pulling the projecting end of a pan liner sheet toward the opposed end for rolling the cake and ice cream layer by bringing an uncoated face of the cake into contact with the layer of ice cream and continuing the roll formation until the flat layers have been completely formed with a roll of distinct convolute layers of ice cream and cake, and thereafter subjecting the composite roll to a freezing temperature whereby the ice cream and cake will retain their separable independent superposed layer formation in a self-sustaining and form-retaining product.

9. A method of producing an ice cream layer cake which consists in preparing a high moisture content flexible and substantially non-porous layer cake, placing the layer cake on a paper lined supporting surface with a glazed cake face upwardly, then coating the layer of cake by spreading a substantial uniform layer of semi-frozen ice cream over the glazed face of the cake to define flat superposed layers, the flat cake layer extremity extending somewhat beyond the flat ice cream layer, rolling the cake and ice cream layer with the aid of the paper liner by bringing an uncoated face of the cake into contact with the layer of ice cream and continuing the roll formation until the flat layers have been completely formed into a roll of distinct convolute layers of ice cream and cake, then bringing the uncoated cake extremity into contact with the adjacent rolled cake surface to enclose the end of the roll, and thereafter subjecting the composite roll to a freezing temperature whereby the ice cream and cake will retain their separable independent superposed layer formation in a self-sustaining and form-retaining product.

PAUL M. ANGELL.